March 22, 1966 A. G. BODINE 3,242,010
METHOD OF AND MEANS FOR APPLYING SONIC ENERGY TO FUEL CELLS
Original Filed Jan. 23, 1961 3 Sheets-Sheet 1
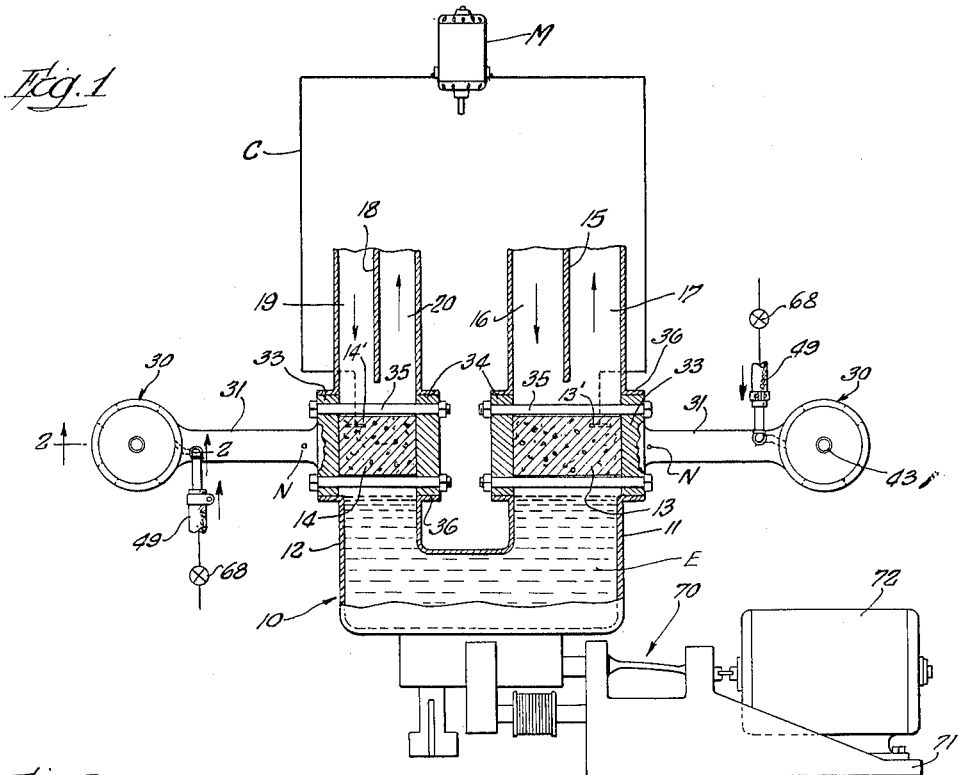
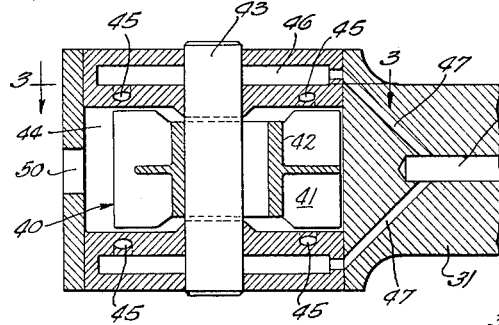
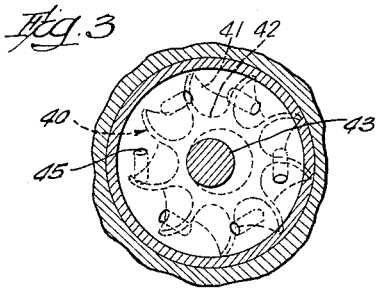
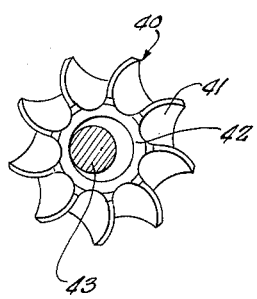
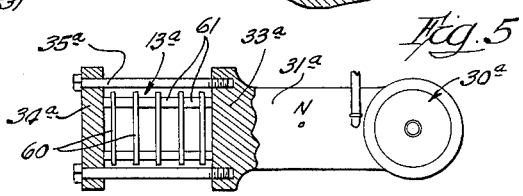
INVENTOR.
ALBERT G. BODINE
BY
Lilly + Nyhagen
Attorneys.

March 22, 1966  A. G. BODINE  3,242,010
METHOD OF AND MEANS FOR APPLYING SONIC ENERGY TO FUEL CELLS
Original Filed Jan. 23, 1961  3 Sheets-Sheet 2
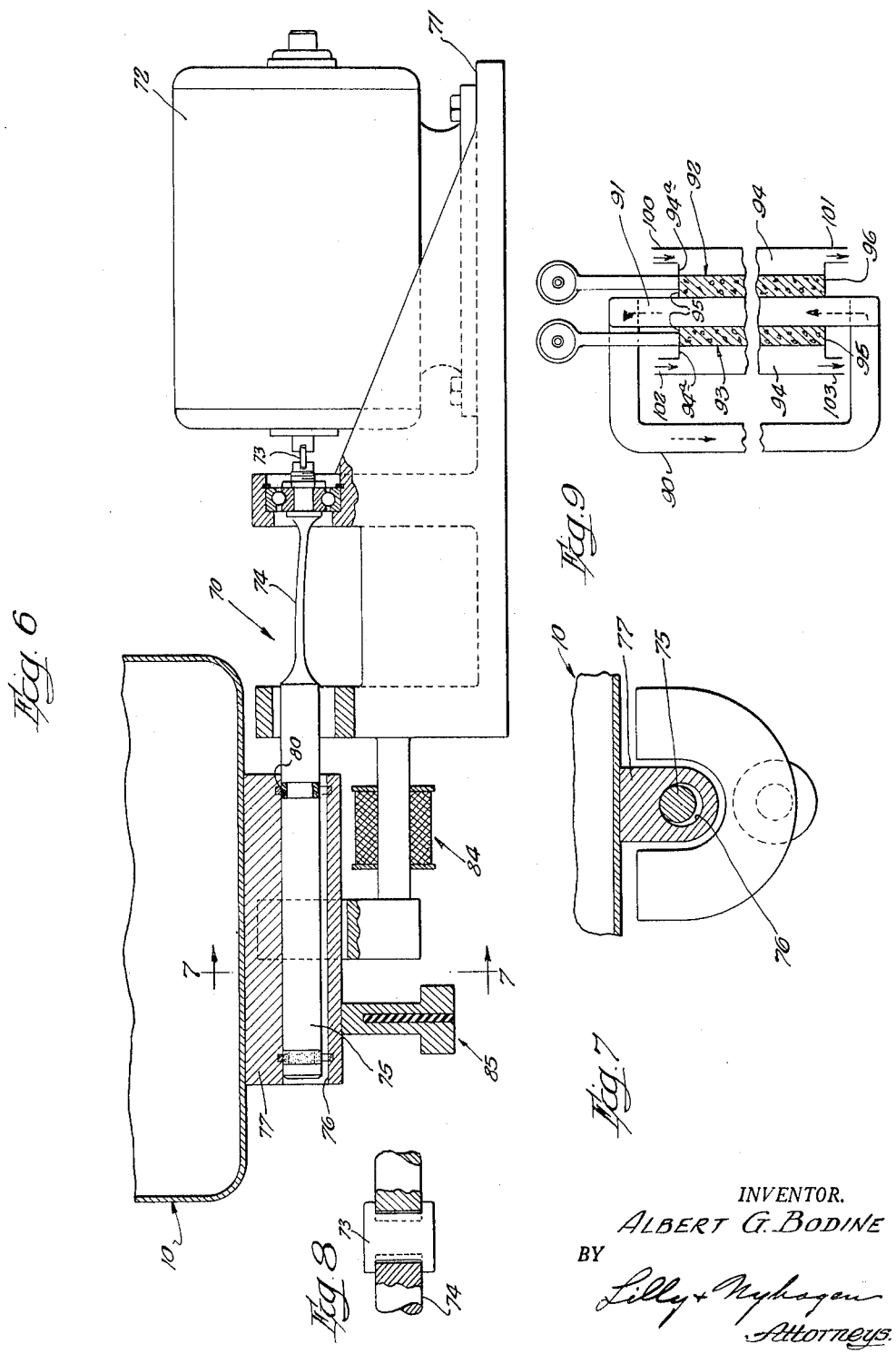
INVENTOR.
ALBERT G. BODINE
BY
Lilly & Nyhagen
Attorneys.

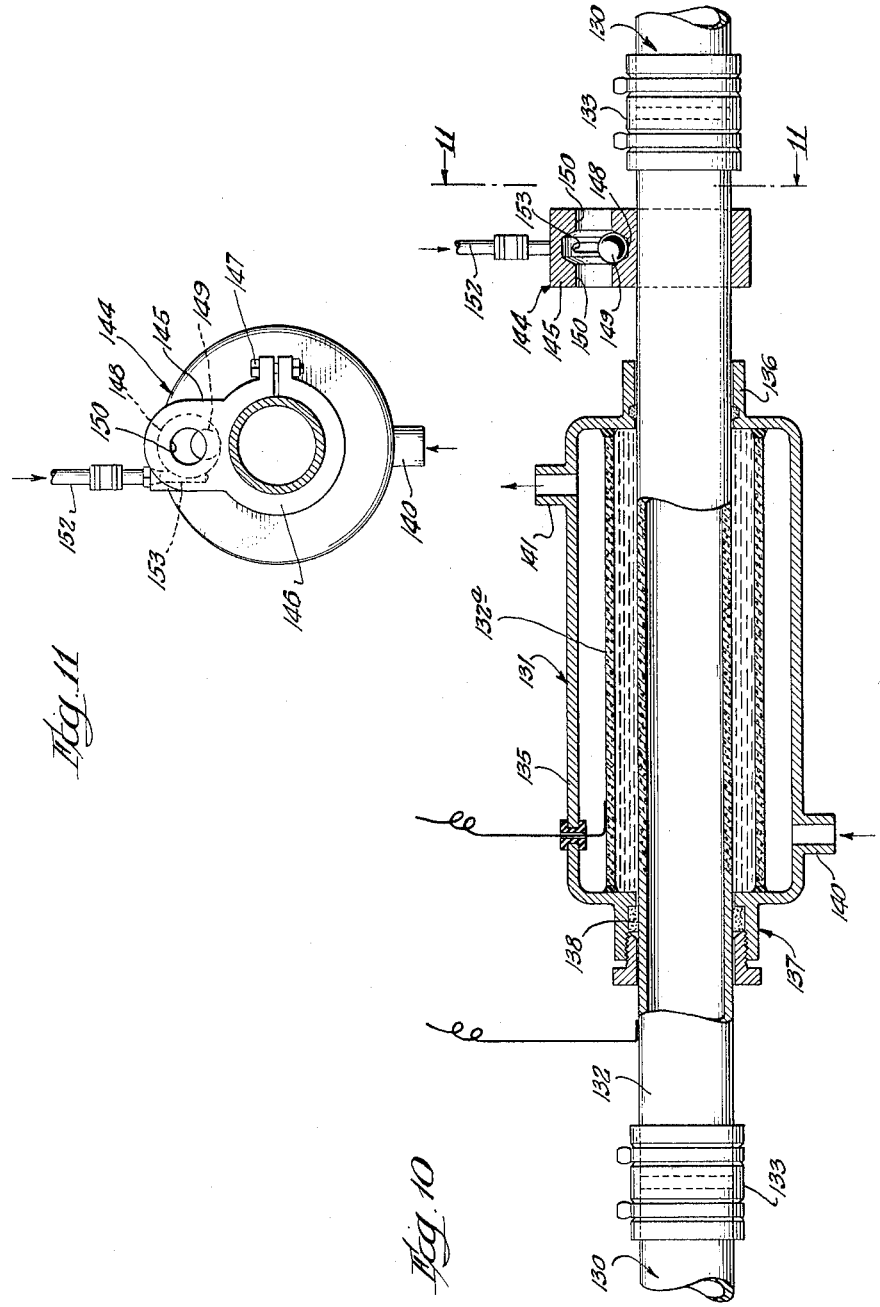

United States Patent Office 3,242,010
Patented Mar. 22, 1966

3,242,010
METHOD OF AND MEANS FOR APPLYING SONIC ENERGY TO FUEL CELLS
Albert G. Bodine, Los Angeles, Calif.
(7877 Woodley Ave., Van Nuys, Calif.)
Continuation of application Ser. No. 84,238, Jan. 23, 1961. This application Dec. 18, 1963, Ser. No. 333,255
19 Claims. (Cl. 136—86)

This application is a continuation of my prior and co-pending application entitled Method of and Means for Applying Sonic Energy to Fuel Cells, filed January 23, 1961, Serial No. 84,238, now abandoned.

This application is a continuation-in-part of my co-pending application Serial No. 55,537, now Patent No. 3,153,530.

This invention relates generally to fuel cells, and deals with the problem of increasing the reaction areas of fuel cells, or the percentage of utilization thereof, through the novel approach of application of sonic wave energy.

It is well known that previously existing fuel cells have fallen short of practicability by reason of small effective reaction area, which is restricted to the zone where the electrolyte phase, gas phase, and electrode surface have a common meeting zone. Ever since the first conception of the fuel cell, efforts have been made to increase this effective reaction area, or the effectiveness of the reaction area, and while marked improvements have been made, as by use of porous, gas diffusion electrodes, fuel cells as heretofore known have not possessed sufficient or sufficiently effective reaction areas for commercial applications.

The present invention does not reside in the chemical composition of the fuel cells, neither electrode composition, fuel, or oxidizer, nor in the nature of its chemical reactions, and these will not be dealt with at length herein, since they may be conventional. However, a brief description of a simple illustrative fuel cell may be useful as a starting point. Such a fuel cell may comprise a pair of electrodes, an anode and a cathode, bathed in an electrolyte, with means for feeding "fuel," i.e., an oxidizable substance, preferably gaseous, such as hydrogen, or a hydrocarbon gas, to the anode and an oxidizer, such as air, to the cathode. The fuel can be in liquid form, or even a solid, such as coal, but at the present time it appears that gaseous fuels will ordinarily be used. Any commonly used gaseous fuel may thus be employed. The two electrodes are connected by an external electrical circuit, in which work may be done. To increase chemical activity, the anode and cathode electrodes may incorporate catalytic agents. When I hereinafter refer to these electrodes, it is to be understood that they will very often include or incorporate catalytic agents. Any common fuel cell electrode compositions may be assumed for the purpose of the invention. Typically, and assuming carbon fuel as a simple example, a carbon atom of the fuel may be oxidized at the anode by two oxygen ions in the electrolyte, at a region of the anode which is a common meeting place of the fuel, oxygen, and electrolyte, all of which constitute component phases participating in the reaction at the anode. The fuel and oxygen may be in the gas phase, and the electrolyte in the liquid phase. The common meeting place of these gas and liquid phases with the electrode surface is the reaction zone. In the case of carbon fuel the reaction also yields a molecule of carbon dioxide, which is carried away; and four electrons are liberated by the oxidized carbon atom. These four electrons flow through the external circuit to the cathode. Air fed to this cathode contains oxygen, and the two atoms of a molecule of this oxygen each take up two of the four electrons arriving from the external circuit, becoming oxygen ions which then travel through the electrolyte to the cathode to complete the circuit. The waste product in this case is nitrogen. Instead of oxygen as the oxidizer, there may be used a gaseous oxidizing medium containing atoms which may take on negative charges to become negative ions. As at the anode, there is a common meeting place, or reaction zone, for the component phases participating in the reaction and comprised in this case of an area of the electrode, the gas phase oxidizer, and the liquid phase electrolyte.

In the light of the foregoing discussion, the general object of the present invention is to provide a method of and means for applying sonic energy to the reaction areas of the anode and cathode electrodes to effectively reorient the geometry of the component phases making up the reaction areas, whereby to effectively enlarge these areas, to increase the percentage of their utilization, and/or to augment the reaction thereat.

The invention involves the application of sonic wave energy directly to the electrodes, and/or to or through the aforementioned gas and/or liquid phase components of the reaction. Broadly, sonic wave action is applied to the common meeting place of the component phases participating in the reaction. This sonic wave activity has a qualitatively distinct ability to reorient the reaction area and effectively enlarge it, or its percentage of utilization, or to enlarge or increase the reaction thereat. The sonic wave energy establishes a unique geometry of the liquid phase electrolyte body relative to the electrode surfaces in the immediate presence of the gas phase component.

One effect is to increase the meniscus angle of the liquid surface relative to the electrode surface. It will be recalled in this connection that a liquid body in contact with a solid confining wall surface has a meniscus effect, according to which, in case of liquids which wet the confining wall, the upper or outer surface of the liquid curves upward as it meets the wall. It will further be recalled that the extent of this effect depends upon the resultant of adhesive forces between molecules of the liquid and molecules of the wall surface, and cohesive forces between molecules of the liquid. In some cases the effect of the sonic wave energy is to increase this effect, giving a thinner and longer "wedge" or "crescent" of liquid extending up the adjacent surface of the electrode. The sonic wave energy applied to the reaction zone alters the equilibrium state attained normally between the effective adhesive and cohesive forces referred to hereinabove, and establishes a new state which is as though the adhesive forces were increased giving higher electrolyte "rise" on the electrode surfaces, together with a cyclic sonic vibration which alternately thins and thickens the wedge or crescent of the electrolyte, permitting effective cyclic or periodic gas phase contact with the electrode surface therethrough. A second effect is that the electrolyte body, both within and below the wedge or crescent of the meniscus, can, under intensive sonic drive, cyclically separate or periodically stand off from the surfaces of the electrode, so as to permit entry of the gas phase therebetween throughout substantial areas of the electrolyte-electrode interface. Throughout this area the electrolyte periodically impacts against the electrode surface.

By the above processes, the usual "tight" wetting contact of the electrode surfaces by the electrolyte, which is normally gas exclusionary in effect, so as to "drown" the electrode surface as regards its simultaneous availability to both the liquid and gas phases, is thus broken by the sonic wave activity, and the gas phase creeps into and spreads throughout a large area where there is otherwise an exclusively liquid phase-electrode surface interface. Thus, under sonic wave application the liquid phase interface with the electrode surfaces, without losing necessary contact with or proximity to the electrode surface, is cyclically disrupted by the sonic activity, permitting gas phase access to the electrode, throughout the interface. Thereby, the fuel and oxidizer gases can slip in, through the thinned "crescent" of the electrolyte, and between the electrolyte and the electrode, while all interaction components, gaseous, liquid and solid, still perform their mutual functions. The effective reaction area where electrode surface and liquid and gas phases meet is thus effectively enlarged. The sonic activity within the reaction region also promotes reaction speed, and thereby increases the percentage of utilization of the reaction area.

In case of application of sonic waves to porous gas diffusion electrodes, a much more porous electrode can be used than is otherwise possible, since the sonic wave vibration ameliorates "drowning" of the electrode by the electrolyte, as mentioned above.

Assuming fuel cells employing gas diffusion electrodes, an object of the invention is to employ sound wave action to accomplish movement of gas into the pores of the electrode, sorption of gas on surfaces (both external and internal) of the electrodes, migration of sorbed gases along such surfaces, movement of gaseous reaction products out of the pores, and diffusion of ions into the electrolyte.

Further objects are to disperse concentration gradients in the electrolyte, and to disperse reaction products from the electrodes.

It is another object of the invention to provide a fuel cell having less critical mechanical tolerances, such as porosity of electrodes in the case of gas diffusion electrodes, and to ease the tolerances of orientation of the electrode relative to the natural liquid level of the electrolyte.

The terms acoustics, sonics, or sound waves, are used herein in the authoritative sense denoting transmission of elastic vibrations in elastic media such as solid, liquid, or gas, irrespective of the audible hearing range.

The broad accomplishment of the invention is that, through use of acoustic techniques, the constituents of fuel, gas, oxidizer and electrolyte can be advantageously oriented and propelled. The invention provides a novel and improved system for bringing the several phases involved in the reaction into large scale reactive orientation.

In connection with the transmission of sonic waves to the component phases of the fuel cell within the reaction zone, the concept of "impedance" is of importance, and should be explained. Assuming application of a sinusoidal exciting force to an elastically vibratory system, the impedance of the system at any point therein, for a given frequency, is the ratio of the magnitude of the exciting force to the magnitude of the resulting vibratory velocity.

For good drive of an elastic member or medium from a sonic wave or vibration generator, the output impedance of the generator, or of the wave transmission means should be of an order generally commensurate with the impedance of the medium driven thereby. A feature of the invention is the application of sonic waves having impedance magnitudes generally commensurate with, and adjusted in particular ways to, the impedance magnitudes of the driven media constituting a phase, or phases, of the fuel cell reactions.

According to one illustrative practice of the present invention, sonic waves are transmitted through an elastic wave transmission means which is acoustically coupled to an electrode means, typically of the porous type, in such a way as to afford a relatively high output impedance for the combination, i.e., somewhat higher than the impedance of the electrolyte. The mis-match between output impedance of the sonically driven electrode means and the electrolyte is then such that although the electrolyte is subject to sonic wave action or vibration, its sonic wave propagation velocity is less than that of the electrode means, so that the wave pattern in the electrolyte and the electrode get out of phase and small gaps for gas intrusion appear cyclically between the electrolyte and electrode surfaces.

According to another illustrative practice of the invention the electrode means, which in this instance might advantageously comprise a plurality of parallel flat plates, is sonically driven at lower impedance, i.e., at an impedance closer to that of the electrolyte. The electrode means in this case will move at greater velocity, but with somewhat lower force. In this case, notwithstanding better impedance match, the electrode plate surfaces can separate from the electrolyte body owing to cavitation. The disruptive effects of this phenomena are to enlarge the effective reaction area and/or its activity, or the percentage of effective utilization thereof.

The sonic wave activity has the further effect of shifting the permeability of a porous medium as regards fluids handled thereby, improving the relative mobility of fluids with respect to the electrode surfaces. Tendencies for any of the fluids to block the electrode as regards the essential fluids, or to by-pass the catalyzed surface and become a contaminant of the other fluids, are ameliorated by the sonic action.

A feature of the invention is control of electrical output rate by a control over the dynamic "air-gap" between electrode and the electrolyte, or over the meniscus angle between electrolyte and electrode surface. This control I accomplish in either of two ways, by control of sonic vibration amplitude, and by control or modulation of sonic vibration frequency. A further feature is the obtainment, through sonic means, of a pulsating electrical output, permitting use of a transformer in the output circuit. Fuel cells are of course normally low voltage sources of direct current, and the use of a voltage step up transformer in the output circuit of the cell is a substantial advantage.

This invention is not to be confused with simply a mechanical agitation process, whose merit does not go beyond the usual benefits of simple agitation. According to the invention, sonic wave energy is applied to the reaction zones of the cell in such a fashion as to reorient advantageously the geometry, activity, mobility, and equilibrium states of the component phases of the reaction area.

Present illustrative embodiments of the invention will now be described with reference to the accompanying drawings, in which:

FIG. 1 is a somewhat diagrammatic cross-sectional view of a typical fuel cell having sonic wave generating means applied thereto in accordance with the invention;

FIG. 2 is a section taken on line 2—2 of FIG. 1;

FIG. 3 is a section taken on line 3—3 of FIG. 2;

FIG. 4 is an elevational view of a rotor of FIG. 2;

FIG. 5 shows a modification of a portion of FIG. 1;

FIG. 6 shows a sonic wave generator means of FIG. 1 to larger scale and with parts in vertical longitudinal section;

FIG. 7 is a section taken on line 7—7 of FIG. 6;

FIG. 8 is an enlarged detail taken from FIG. 6; and

FIG. 9 is a diagrammatic view of a modified fuel cell provided with means for sonic wave application.

With reference first to FIGS. 1–4 of the drawings, numeral 10 designates generally a fuel cell tank, of generally U-shaped form, having tubular anode leg 11 and tubular cathode leg 12. In these legs are installed porous metal anode and cathode electrodes 13 and 14, respectively, which in this case constitute barrier walls across the tubular legs of the tank. A suitable electrolyte 8 is introduced into the tank 10 and rises in the legs to the electrodes, and, by capillary pressure, up into the pore structures of the electrodes, the total interior surface area of which is quite large. A quantity of electrolyte is used which does not, of course, completely submerge the electrodes. The liquid level should be such as to fully meet the electrodes, and to permit capillary rise of the electrolyte into the porous structure of the latter.

The portion of leg 11 above the anode is utilized for feeding of gaseous fuel to the anode, and carrying away of reaction products; and the portion of leg 12 above the cathode is utilized for feeding of oxidizer, e.g., air, to the cathode, and carrying away waste products, e.g., nitrogen. To this end, leg 11 is provided with a partition 15 whose lower edge terminates shortly above the anode, thus forming feed and discharge conduits 16 and 17; and leg 12 is provided with a similar partition 18 forming feed and discharge conduits 19 and 20.

Electrodes 13 and 14 are of porous metal or other conducting material. The electrodes can be of catalytic material, or be coated with catalytic material, or have particles of catalytic material interspersed throughout the porous material, as is well known in the art. Embedded in these electrodes are contact plates 13' and 14', to which are connected opposite ends of an external electric circuit C containing a power consuming device such as electric motor M. The general nature of the chemical-electrical reactions taking place in such a fuel cell, as so far described, are well known in the art, and have already been briefly mentioned in simple form. The reaction area at each electrode, as is known, is confined to an area where the gas and liquid phases meet each other and the electrode surface. Despite use of porous electrodes, this area is invariably insufficient in fuel cells as heretofore known.

According to the invention, sonic wave energy is applied to the reaction area to enlarge it and/or its effectiveness, and to this end sonic wave oscillators or generators 30 are acoustically coupled to electrodes 13 and 14, in this case by elastic sound wave transmission rods 31. In the cell here illustrated, the electrodes 13 and 14 are each mounted between end plates 33 and 34 connected by elastic draw bolts 35. In this manner the sometimes frangible porous electrodes are pre-stressed in compression, so that they will not give problems of fatigue failure from the sonic vibrations.

The electrode end plates 33 and 34 for each leg of the cell are mounted in apertures 36 in opposite sides of the legs, as shown.

The aforementioned elastic wave transmission rods 31, composed preferably of steel, are made integral at their inner ends with the electrode end plates 33, and carry at their outer ends the sonic oscillators 30.

The sonic oscillators or vibration generators 30 may be as shown in FIGS. 17–20 of my U.S. Patent No. 2,960,314, and will be only briefly described herein, reference being directed to said patent for a complete description. Briefly, a rotor 40 has peripheral impeller blades 41 and a hub 42 which fits a fixed axle pin 43 with clearance. This rotor is contained in a cylindrical chamber 44, into which jets of air are injected through angularly disposed nozzle ports 45. The air is supplied from manifolds 46, which are fed through passages 47 and a passage 48 in rod 31, supplied with air under pressure from a hose 49. Spent air is discharged through port 50. The rotor 40, turning on the fixed axle 43 with its center of gravity off center of the axle pin, exerts a rotating radial force on the axle 43, and therefore on the housing of the oscillator, and in turn on the outer end of the rod 31.

The speed of rotation of the rotor depends upon the pressure of the air fed to the system via the hose 49, and this air pressure is preferably made such that the spin frequency of the rotor approximates the longitudinal standing wave frequency of the rod 31 carrying the oscillator at one end, and loaded by the corresponding fuel cell electrode at the other. Preferably, an approximation of a half wavelength longitudinal standing wave mode of vibration is selected. It will be recalled that the spinning rotor of the oscillator exerts a corresponding spinning force on the end of the rod 31. This spinning force may be resolved into a component of alternating force longitudinal of the rod 31, and a component of oscillating force transverse of the rod 31. The spin frequency is made to correspond closely to a selected longitudinal resonant frequency of the rod 31 taken together with the associated electrode structure and the rod and electrode structure are set into longitudinal standing wave vibration. This frequency is so far removed from a resonant frequency for lateral vibration that the lateral component of vibration is relatively insignificant, or can be easily damped by known procedures.

It will be observed that the physical configuration of the sonic wave application system of FIGS. 1–4 is characterized by sonic wave or vibration transmission rods 31 which are relatively slender as compared with the end plates 33 and 34 and intervening electrodes 13 or 14, as the case may be. The electrode and end plate assemblies are thus, by comparison with the cross section of the rods 31, somewhat bulky, and have the character of a somewhat localized mass. In terms of wave theory, these assemblies have a degree of "lumped constant" characteristic, as distinguished from the "distributed constant" characteristics of an extended elastic rod without localized concentrations of mass. At the same time, the electrodes are long enough in the direction of the rods 31 so as to have some distributed constant character, and some degree of standing wave pattern. Each system of oscillator 30, rod 31 and electrode assembly undergoes a somewhat modified half wavelength standing wave action, with a velocity node at N, and a velocity antinode within the oscillator 30. The distance from this velocity antinode at the oscillator to the node N is close to a quarter wavelength. By reason of the partial lumped constant character of the system from node N through the electrode, this portion of the system is substantially less than a quarter wavelength in length, and its average impedance is greater than the average impedance of the rod 31 from oscillator to node. However, the impedance of the resonant standing wave of rod 31 is very high in the region of node N, and is in fact commensurate with that of the electrode thereadjacent. The electrode therefore vibrates with less velocity and amplitude than does the oscillator end of rod 31, but with increased force. The output impedance of the porous electrode is therefore relatively high with respect to the electrolyte, such as to afford a substantial degree of impedance mismatch and wave velocity mismatch. Under such conditions, the sonically vibratory electrode surfaces vibrate out of phase with the liquid electrolyte, and therefore periodically separate slightly therefrom, allowing gas phase entry, as described hereinabove. The sonic wave application also reorients the liquid surface angle relative to electrode surface angle, thinning the crescent of the meniscus at all points of contact between the electrolyte and electrode surfaces, and permitting gas phase access to the latter, as described hereinabove. Both of these effects accomplish enlargement of the reaction area, at both the exterior and interior surfaces of the electrodes.

As will be clear, the electrodes can be driven at lower impedance, more closely matched to that of the electrolyte, as by use of thicker rods 31. The nodes N will then shift toward the oscillators. At the lower impedance, the sonic vibration of the electrodes will be at greater velocity and displacement amplitude, but at lesser force. Under these conditions, the liquid electrolyte may again periodically separate from the electrode surface, as through the phenomena of cavitation.

Actual tests with a system like that of FIG. 1 have shown an increased current delivery, by application of sonic energy as disclosed, up to the heat dissipation ability of the apparatus. In other words the upper limit in this case is the ability of the system to handle the increased heat coincident with increased current caused by the sonic augmentation of the fuel cell reaction. Prior to this time the limitation has always been the current rate which could actually be produced, limited by the effective dimensions of the mutual reaction zone where electrode, electrolyte, and fuel or oxidizer meet. Moreover, there have been no indications of electrode "drowning" as a result of sonic vibration, and in fact the increased reaction rate is direct evidence that detrimental "drowning" is prevented by sonic action.

Obviously, if the heating effect did not present an upper limit in this case, there would be another factor limiting the maximum sonic power which could be put in, and this factor would be the sonic power level at which physical destruction of structure begins to take place. However, there is a wide range of beneficial operation below this destruction level.

The lower limit of sonic input is that requiring actual acoustic coupling from the sonic source to the reaction area of the cell via an elastic vibration power transmitting medium. For example, incidental sound transmission through the air (such as from a musical program) to the location of a fuel cell would be below the lower limit defined by acoustic power coupling relationship.

Tests have shown that the various paths of acoustic transmission accomplished by the location of the oscillators in FIG. 1 are all effective. Moreover, in the higher power operating range of the cell it has been found that the effect of the various paths of sonic energy is accumulative. That is, running all three oscillators of FIG. 1 gives a greater current boost than by running less than all three. Moreover, in this manner it is found that the total effect can be higher since there is no over-stressing from any one oscillator location or transmission path doing the whole job.

Actual tests have shown that the electrodes stand up very well, even in fairly flexible proportions where element 13 is 9" x 9" by 7/16" thick.

In FIG. 5 is shown a modified electrode structure 13a, sonic wave transmission rod 31a and oscillator 30a which may be substituted for the corresponding members of FIG. 1. It will be understood, of course, that a similar substitution may be made for the electrode structure 14a, and the rod 31 and oscillator 30 corresponding thereto. Two significant modifications have been made. First, the rod 31a is of increased cross-section, tending toward lower output impedance at the electrode. And second, the porous metal electrode is replaced by a plurality of flat, parallel plates 60, disposed transversely of the rod 31a. The plates 60 are spaced by spacer lugs 61, and assembled between end plates 33a and 34a with the aid of bolts 35a, the end plate 33a being integral with rod 31a. In this case, when the oscillator is driven at the fundamental resonant frequency for longitudinal standing wave vibration of the assembly 30a, 31a and 13a, substantially a half wave longitudinal mode is produced, with the node located near the mid-point of the assembly, as at N. Here, the output impedance at the electrode structure is lower than in the first described form of the invention, and more closely matched with the electrolyte.

The electrolyte is filled in the tank 10 to a level well up on the plates 60. The sonically vibrating plates 60, moving alternately toward and from the electrolyte under the sonic wave action transmitted along the rod 31a, reorient and enlarge the mutual reaction area as generally described above.

The sonic wave oscillators 30 may be readily controlled through useful ranges as regards both amplitude of output wave, and frequency. Control valves 68 are placed in the air pressure lines feeding hoses 49. As these are gradually opened, the oscillators are brought gradually up to speed. Throughout a frequency range of some substantial extent preceding and leading up to peak resonance, they have sufficient vibratory output for effective operation, and operation with modulated frequency and amplitude in this frequency range is obtained by periodically throttling the air flow by means of valves 68. Not only can the frequency be thus varied or modulated, but the amplitude of sonic wave output as well. Particularly in the frequency region comprising the low side of the resonance curve, and close to or immediately adjacent peak resonance, increase or decrease in air flow, under control for example of valves 68, results predominantly in vibration in sonic wave amplitude, with only small or incremental frequency change.

Thus by variation of air flow through valves 68 throughout a relatively wide range, modulation of frequency is predominantly realized, with accompanying accelerated increase in amplitude if or as peak resonance frequency is closely approached. On the other hand, by variation of air flow through valves 68 in a narrow range on the low side of the resonance curve, close to peak resonance, modulation of amplitude, or sonic intensity, is predominantly realized.

It will be seen that valves 68 comprise a means for adjustment of the fuel cell to a desired optimum operating state. Also, by continuous variation, or pulsing, of the air flows to the oscillators by periodic opening and closing movements of these valves 68, throughout predetermined ranges, as discussed above, the operating state of the cell can be correspondingly modulated. By this means, for example, the reaction areas of the cells can be periodically varied, or pulsed, with the result that the voltage and/or current output of the cell is correspondingly varied. In effect, the internal electrical resistance of the cell is fluctuated, with corresponding effect in the external circuit. The resulting voltage variations in the external circuit permit use of a transformer therein, permitting a desirable step up in voltage.

The oscillators 30 coupled to rods 31 of FIGS. 1-4 constitute a means for applying sonic wave energy to the reaction areas of the cell via the electrodes. FIGS. 1 and 6-8 show a sonic wave generator means 70 for applying sonic energy to the reaction area via the electrolyte. This generator means 70 is disclosed and more completely described in my prior Patent No. 2,960,314 (see FIGS. 21-23), and will therefore be only briefly described herein. The fuel cell tank 10 is preferably provided with an elastically vibratory bottom wall, to which the apparatus 70 is applied. A base frame 71 supports electric motor 72 whose shaft is keyed as to 73 at a slender, flexible and elastic quill shaft 74 formed on the end of a cylindrical rotor 75. The rotor 75 is received, with clearance, in a bore 76 extending through a block 77 affixed to the bottom of tank 10.

Rotor 75 rolls around the periphery of bore 76, driven through flexible shaft 74 from motor 72, friction inserts at 80 affording traction. The rotor exerts a centrifugal force on member 77, and thence on the flexible elastic bottom wall of tank 10. This force, applied to the tank bottom, sets the latter into gyratory vibration, which in turn causes transmission of sonic waves through the electrolyte in the tank 10. The rotor 75 may be driven to make a number of circuits per second around the bore 76 which is substantially equal to a resonant frequency of the tank bottom, including the resonant effect of the liquid body therein. Vibration amplitude of the latter is thereby amplified, and strong sonic wave transmission occurs through the electrolyte.

This sonic wave action in the liquid is transmitted to the reaction area, and accomplishes relative sonic vibration between the electrolyte and electrode surfaces contacted thereby, with results of the same general nature accomplished by sonic vibrations of the electrodes. As will be evident, sonic wave action may thus be applied to the reaction areas through the electrodes, or through the electrolyte, or through both in combination.

The structure generally designated at 84 in FIG. 6 comprises a magnetic means for increasing traction between the rotor 75 and the surface of raceway bore 76, and that at 85 is a vibration damping means, both of which features are fully described in my aforesaid Patent No. 2,960,314 and need not be dealt with herein.

FIG. 9 shows diagrammatically another physical configuration of fuel cell which lends itself quite well to application of the present invention, and which has the advantage of a short electrolyte path between the cathode and anode. It also illustrates direct sonic wave application to the gas phase component of the reaction area.

A continuous conduit 90 for electrolyte has a vertical reaction leg 91, and opening into opposite sides thereof are anode and cathode porous metallic electrode plate structures 92 and 93, respectively, of conventional make-up. It will be understood that the surfaces of these plates facing the leg 91 are exposed to the electrolyte inside the leg, and that the electrolyte penetrates the porous structure of the electrodes.

Adjacent the outside surfaces of the electrode plates 92 and 93 are gas chambers 94, whose upper and lower walls 95 and 96 engage the upper and lower ends of the anode and cathode electrodes. It will be observed that the upper walls 95 project substantially beyond the electrode plates to form wall portions 94a overhanging the gas space chambers 94.

Opening into the anode gas chamber 94 is a fuel inlet conduit 100, and leading therefrom is reaction products outlet conduit 101. Similarly, leading into cathode gas chamber 94 is oxidizer inlet conduit 102, and leading from the chamber is waste outlet 103. The introduced gases thus reach the surfaces of the porous electrodes, enter into the pores thereof, so as to meet the electrolyte liquid phase, and so provide the reaction area.

Sonic oscillators 105, like the oscillators 30 of FIG. 1, and elastic wave transmission rods 106, like the rods 31 of FIG. 1, are coupled to the walls 95. Several possibilities exist. If the walls 95 and their portions 94a are stiff and heavy, the sonic coupling is primarily to the solid electrodes 92 and 93. Operation of the invention is then much as already described hereinabove. If, on the other hand, the wall portions 94a are relatively flexible or limber, a large degree of sonic coupling to the gases in the chambers 94 is attained. Thus, in the latter case, sonic wave application to the reaction area (which is again the common meeting place of the electrode surfaces, both internal and external, the liquid electrolyte phase, and the gas phase) is by way of the gas phase. Sonic waves are thus transmitted through the gas phase to and into the porous electrode to the reaction area. There, the gas oscillations, coupling to the liquid phase, result in sonic wave action of the liquid phase relative to the solid electrode phase, with favorable consequences of the type heretofore mentioned. In addition, the desired progression of gas phase components, and waste product elimination is aided by sonic action on sluggish boundary layers.

It should now be evident that the illustrative embodiments of the invention shown and described in the foregoing are fully capable of accomplishing the objects preliminarily stated.

It has been fully explained how the sonic wave action increases the reaction area, and reduces fluid sluggishness at the boundary layers. It will be clear that the sonic wave action, by reducing the gas exclusionary effect of the liquid, permits gas contact with increased areas of the electrode surfaces, and thus reduces tendencies for "drowning" of the electrode surfaces by the electrolyte. A favorable consequence is that more porous electrodes can be used. It has been shown how the sonic wave action permits increased mobility of the gas phase along the electrode surfaces, and the gas phase is thus permitted better access or inflow into the porous structure. Waste gaseous products are by the same token given better opportunity to leave the porous structure. By increasing the mobility and spreading of the gas phase, there is more widespread sorption of the gas on the electrodes, and migration of the sorbed gases along the electrodes. The sonic wave activity acts also to diffuse ions within the electrolyte.

The sonic wave activity within the liquid phase is useful in dispersing concentration gradients within the electrolyte, and in dispersing reaction products from the electrode.

This invention includes a type of boundary layer control or actuation, wherein the tendency of boundary layers of fluids to be sluggish is greatly ameliorated. These boundary layers exist at liquid to solid interfaces, gas to solid interfaces, and gas to liquid interfaces. Much of the reaction of a fuel cell is a type of boundary layer chemistry or electron exchange. These boundary layers can become "poisoned" by accumulation of unwanted components such as reaction products. A sonic technique as I have shown herein activates the boundary layer by virtue of transmission of sonic energy thereto so that sonic differences in the various media, such as impedance mismatch, results in relative elastic vibration and "unlocking" of undesirable adhesion.

FIGS. 10 and 11 show an illustrative form of the invention characterized by transmission of the sound wave vibration to the boundary layer via a tubular electrode wall, the sound wave generator being directly coupled to said wall. Numeral 130 designates generally a pipe line for a fluid which, for illustrative purposes, may be assumed to be hydrogen, and which is to be reacted by passing through fuel cell apparatus 131. Pipe line 130 includes centrally porous elastic pipe section 132, as shown, coupled into line 130 by means of flexible couplings 133, for instance, sections of insulating flexible hose. The central region of electrode pipe 132 should be of good elastic material, preferably, a grade of sintered metal having high elastic fatigue properties. Surrounding electrode pipe 132 is opposite electrode pipe 132a of porous electrode material and mounted in casing 135 by insulating adhesive as shown, and having electrical connection as shown. Electrolyte may thus be retained within the annular space between 132 and 132a. Surrounding pipe 132a, and annularly spaced therefrom, is cylindrical external conduit or casing 135, tightly clamped at one end, in fluid sealing relationship, to pipe 132 at a point preferably one quarter of the length of said pipe from one of its ends, in this instance, its upstream end, and a suitable clamping means, such as indicated at 136, is used for the purpose. At its other end, casing 135 is connected to pipe 132 by means of a gland 137 including any suitable resilient packing means 138 permitting some degree of vibration of the pipe. Both of said clamping means should be non-conductive; or 135 may be of non-conductive material such as plastic. The gland 137 may preferably be located in the region of the other quarter length point of pipe 132. The direction of fluid flow in pipe 132 is assumed to be from right to left as viewed in the figure. The left hand end of casing 135 is provided with inlet 140 for oxidizer fluid, and the opposite end thereof is provided with outlet 141 for reaction products of said fluid.

The right hand or "upstream" end of pipe 132 is provided with a vibrator 144, capable of generating vibrations of sonic frequency in pipe 132, and causing them to be transmitted the length of said pipe, and to form an elastic wave pattern along the pipe. The vibration frequency of this generator is preferably so related to the length of pipe 132 as to set up a condition of standing wave resonance therein. For vibration at resonance in the fundamental mode, the pipe 132 should have a length equal to one wave-length of the wave produced by generator 144. Preferably, for greatest vibration action of pipe 132, generator 144 is of a type producing a rotary mode of transverse vibration of the right hand end portion of the pipe, the latter being in effect a free elastic bar. One example of such a generator is shown in FIGS. 10 and 11, and comprises a generator housing 145 having a split strap 146 surrounding pipe 132 and set up tightly by means of fastening screw 147. Housing 145 has a circular interior chamber 148 forming a track or race for a steel ball 149, and chamber 148 has concentric ports 150, of lesser diameter than the chamber 148, opening through opposite sides of the housing 145. An air or steam supply pipe 152 connects to the injection nozzle opening 153 arranged tangentially with respect to circular ball race or chamber 148. Air or steam under suitable pressure injected at 153 drives ball 149 around race 148 at a high rate of speed, for example of the order of 60,000 r.p.m., causing the right hand end portion of elastic pipe 132 to be subjected to a rotating force vector which continuously bends it, in a circular path. If the frequency of rotation of the ball 149 corresponds substantially to the fundamental resonant frequency of pipe 132, said pipe will have a standing wave established therein, with nodes (points of minimum transverse vibration) located at one-quarter of its length from each of its ends, and with antinodes (points of maximum transverse vibration) at its center and at both ends. This standing wave is the result of elastic waves propagated longitudinally along pipe 132 and reflected from its far end, the transmitted and reflected waves interfering in such a way at the resonant frequency as to give the nodes and antinodes as described, all in accordance with fundamental wave theory. The one-quarter length point of the pipe being the location of a node becomes a desirable point for clamping the end of casing 135 thereto. In the present instance, no effort has been made to clamp the other end of casing 135 to the pipe precisely at the other node, and the resilient packing 138 has accordingly been provided to permit yielding with the vibratory action of the pipe at the point of connection. The vibratory action of pipe 132 will accordingly be transmitted to the liquid within the annular space between said pipe and the electrode 132a, but it will not be substantially transmitted to casing 135. Vibratory action of pipe 132 will of course also be transmitted to the fluid flowing within itself.

Considering again the boundary layer conditions adjacent both the inner and outer surfaces of pipe 132, thin films of dormant liquid or gas may collect along said surfaces and effectively insulate against rapid reaction, as previously described. Moreover, conditions of viscous flow, as previously described, may prevail adjacent both the inner and the outer surfaces of pipe 132 for a substantial proportion of its length, and may militate against effective action. But with the gyratory vibration of the pipe 132, rising to maximum amplitude at the mid-section of the pipe, liquid or gaseous films adjacent both surfaces of the pipe, as well as the viscous boundary layer, are severely agitated, broken up and dispersed, bringing about intimate contact of the inner and outer fluids with the pipe 132, as well as a condition of turbulent flow both inside and outside the pipe 132, with increase on the boundary layer activation in accordance with principles already described.

The sonic wave activity in the reaction area reduces materially the criticalness of certain mechanical tolerances, such as electrode pore size, as well as those of electrode orientation relative to electrolyte liquid level. In short, sonic wave activity increases the tendency for desired reactions to proceed, and reduces the criticalness of many conditions otherwise required for useful operation to occur.

The invention has been shown in certain illustrative applications to more or less simple or common forms of fuel cell. It is of course to be understood that these are for illustrative purposes only, and that the invention may be embodied or incorporated in fuel cells of greatly modified physical configuration without departing from the scope of the appended claims.

I claim:

1. The method of improving the operation of a fuel cell having a reaction area at which component electrode, electrolyte, and fuel or oxidizer phases of the cell meet one another, that comprises:

generating sonic vibrations; and transmitting said vibrations to said reaction area through at least one of said component phases of said cell;

said vibrations being in a frequency and amplitude range which increases the reaction in said area.

2. The method of claim 1, wherein the sonic vibrations are transmitted to the reaction area through a solid structure constituting said electrode phase.

3. The method of claim 1, wherein the sonic vibrations are transmitted to the reaction area through a liquid constituting said electrolyte phase.

4. The method of claim 1, wherein the sonic vibrations are transmitted to the reaction area through a body of gas constituting said fuel or oxidizer phase.

5. The method of claim 1, including also the step of modulating the amplitude of said sonic vibrations.

6. The method of claim 1, including also the step of modulating the frequency of said sonic vibrations.

7. The subject matter of claim 1, wherein the sonic vibrations are maintained at fixed frequency and amplitude.

8. The method of improving the operation of a fuel cell having a reaction area at a mutual meeting place of electrode, liquid electrolyte, and fuel or oxidizer phase media comprising mutually interacting components of the cell, that includes:

producing sonic vibrations in a vibratory means at an acoustic impedance magnitude of that of a selected component of said cell;

acoustically coupling said vibratory means to said selected component; and transmitting a pattern of said sonic vibrations from said vibratory means into said selected component; said sonic vibrations being in a range of frequency and amplitude which increases said reaction in said area.

9. The subject matter of claim 8, wherein said selected component comprises an electrode of said fuel cell.

10. The subject matter of claim 8, wherein said selected component comprises an electrolyte of said fuel cell.

11. The subject matter of claim 8, wherein said component comprises a gas phase component of the media.

12. In a fuel cell having a reaction area at the common meeting place of electrode, liquid electrolyte, and fuel or oxidizer phase media comprising mutually interacting components of the cell, a sonic vibration generator, and sonic vibration transmission means acoustically intercoupled between said generator and one of said phase media for transmitting thereto sonic vibrations produced by said generator; said sonic generator having a sonic output range which increases the mutual interaction of said phases.

13. The subject matter of claim 12, wherein said sonic vibration transmission means is adapted for transmitting said sonic vibrations to said one of said phase media at an impedance magnitude thereof.

14. The subject matter of claim 12, wherein said sonic vibration transmission means is intercoupled between said vibration generator and an electrode comprising a solid phase component of said media.

15. The subject matter of claim 12, wherein said sonic vibration transmission means is intercoupled between said vibration generator and the electrolyte comprising a liquid phase component of said media.

16. The subject matter of claim 12, wherein said sonic vibration transmission means is intercoupled between said vibration generator and a gas body comprising a gas phase component of said media.

17. The subject matter of claim 12, including also means for modulating the amplitude of sonic vibrations generated by said sonic vibration generator.

18. The subject matter of claim 12, including also means for modulating the frequency of sonic vibrations generated by said sonic vibration generator.

19. In a fuel cell having a reaction area at the common meeting place of electrode, liquid electrolyte, and fuel or oxidizer phase,
  a sonic vibration generator; and
  an elastic medium acoustically coupled between said generator and said reaction area so as to comprise a path for transmission of elastic vibrations of substantial displacement and energy content to said reaction area;
  said generator being acoustically coupled to said elastic medium and producing, for transmission therethrough to said reaction area, elastic vibrations of substantial amplitude and in the sonic frequency range which increases the common reaction of said three phases.

References Cited by the Examiner
UNITED STATES PATENTS

| 1,965,399 | 7/1934 | Wehe | 204—154.1 |
| 2,384,463 | 9/1945 | Gunn et al. | 136—86 |
| 2,470,741 | 5/1949 | Gordon | 204—154.1 |

OTHER REFERENCES

Dudley Thompson: Ultrasonics, A New Chemical Engineering Tool in "Chem. Eng. Progress," vol. 46, No. 1, pages 3–6.

WINSTON A. DOUGLAS, *Primary Examiner.*

JOHN H. MACK, *Examiner.*